United States Patent

[11] 3,578,190

| [72] | Inventors | Joe C. May<br>139 Calhoun St., Biloxi, Miss. 39531;<br>James D. Lowery, Jr., 127 T Pass Road,<br>Jackson, Miss. 39203 |
|---|---|---|
| [21] | Appl. No. | 839,485 |
| [22] | Filed | July 7, 1969 |
| [45] | Patented | May 11, 1971 |

[54] MULTIPURPOSE TRAILER
13 Claims, 9 Drawing Figs.

[52] U.S. Cl. .................................................... 214/505,
214/517, 280/414
[51] Int. Cl. ..................................................... B60p 3/10
[50] Field of Search .......................................... 214/505,
506, 84, 515—517, 500; 280/414

[56] References Cited
UNITED STATES PATENTS

| 2,750,058 | 6/1956 | Burch............................ | 214/515 |
| 3,018,907 | 1/1962 | Gail............................... | 214/515X |

*Primary Examiner*—Albert J. Makay
*Attorney*—Burns, Doane, Benedict, Swecker & Mathis ABSTRACT: A multipurpose trailer particularly adapted for use as a combination boat and dog/utility trailer in which a separable frame is provided for supporting a boat on a running gear for the transporting thereof, as well as independently of the running gear for the storage thereof. A method for mounting and dismounting the separable frame from the running gear with a boat thereon is also disclosed.

Patented May 11, 1971
3,578,190
2 Sheets-Sheet 1
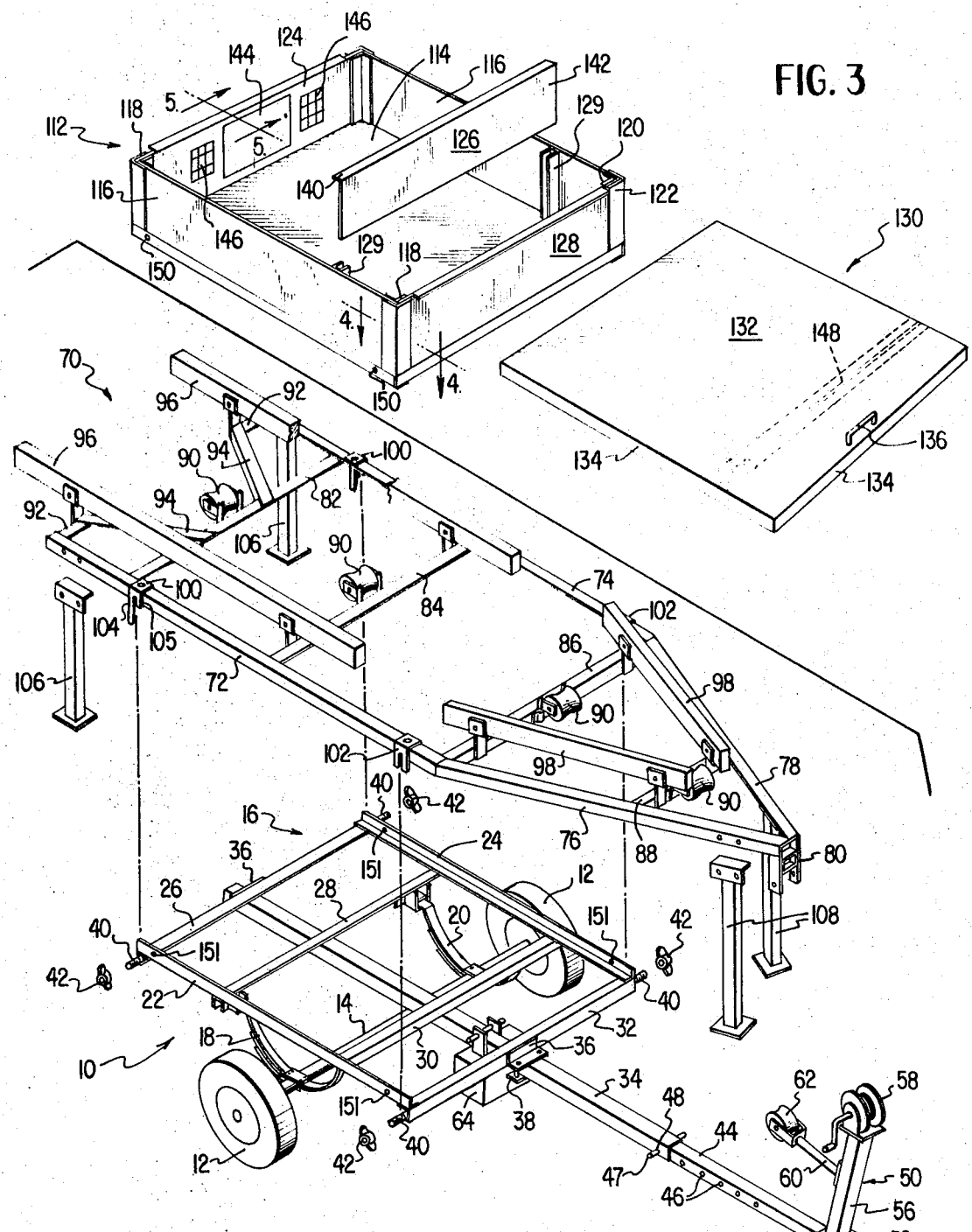
FIG. 3
FIG. 1
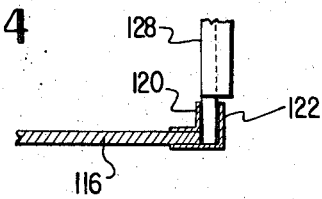
FIG. 4
INVENTORS.
JOE C. MAY
JAMES D. LOWERY, JR.
BY Burns, Doane, Benedict, Swecker & Mathis
ATTORNEYS.

Patented May 11, 1971 3,578,190
2 Sheets-Sheet 2
FIG. 2a
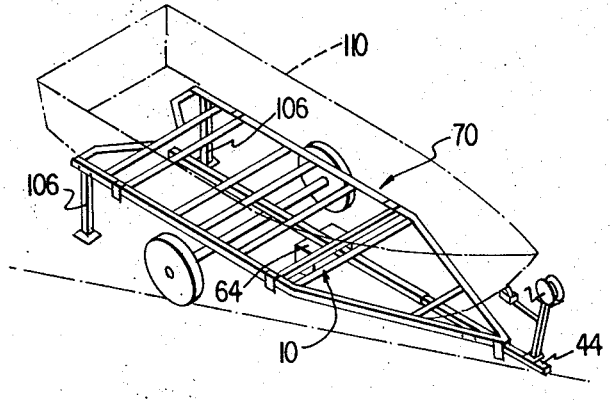
FIG. 5
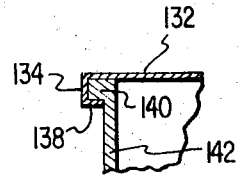
FIG. 2b
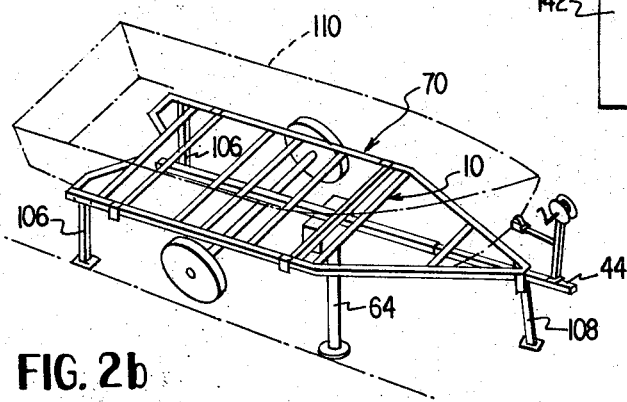
FIG. 6
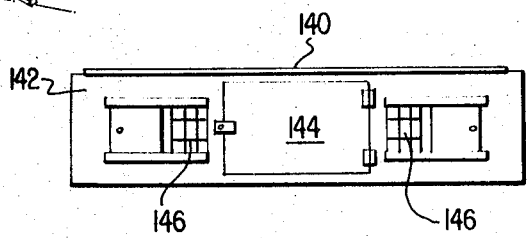
FIG. 7
FIG. 2c
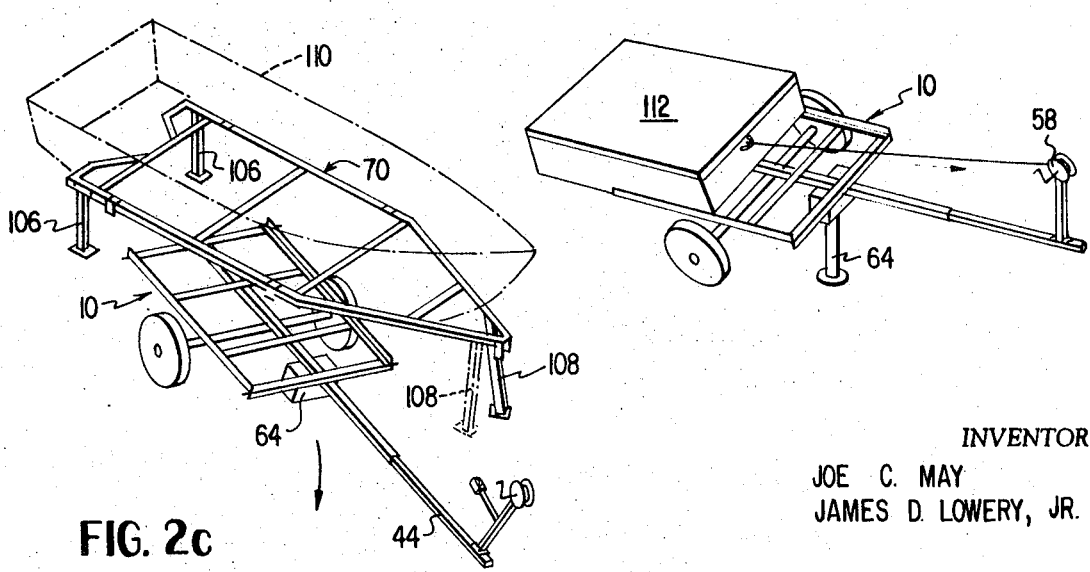
INVENTORS.
JOE C. MAY
JAMES D. LOWERY, JR.
BY Burns, Doane, Benedict, Swecker & Mathis
ATTORNEYS.

MULTIPURPOSE TRAILER

BACKGROUND OF THE INVENTION

This invention relates to multipurpose trailers and more particularly to a combination boat, utility and dog trailer.

Conventional trailers such as boat, utility and dog trailers are well known and have been used extensively in the past. These trailers however usually are separate distinct trailers permanently attached to running gear and therefore serve only a single purpose. To reduce the cost of a plurality of such single purpose trailers and to make the trailers functionally more useful, various attempts have been made to provide combination trailers which may be used for more than one purpose. Examples of known prior art attempts are illustrated in the Sampsell, U.S. Pat. No. 2,374,383, the Halverson, U.S. Pat. No. 2,720,413, the White, U.S. Pat. No. 3,098,674 and The Taylor et al. U.S. Pat. No. 3,266,836 in which trailers which may be converted from boat trailers to utility or flat bed trailers are shown.

In each of these patents however, the body being carried on the trailer must be removed before the conversion of the trailer for another use. Since it is the usual practice and often highly desirable to store many bodies, and especially boats, on the trailer when not in actual use, these known combination trailers have restricted utility. Furthermore, it is desirable to provide a trailer body which may be itself converted for various specific purposes. One such specific purpose which is especially desirable for hunting is a utility trailer body which may be converted into a dog trailer for carrying hunting dogs and camping gear.

It is therefore an object of the present invention to provide a novel multipurpose trailer which includes a separable portion for supporting one body thereon which may be removed to support that body in storage.

It is another object of the present invention to provide a novel multipurpose trailer which includes a body carried thereon which may easily be converted from a utility trailer to a dog trailer.

It is still another object of the present invention to provide a novel multipurpose trailer which includes means for facilitating the mounting and demounting of the various bodies thereon.

It is a further object of the present invention to provide a novel method for mounting and demounting a separable portion of the trailer with a body supported thereon to allow storage of that body on the separable portion.

It will be appreciated, of course, that the present invention has broader utility than the specific embodiments illustrated. For example, the current mobility of the population of the United States today has given rise to businesses based solely on the rental of trailers for the transportation of items by individuals.

In businesses of this type, a large inventory of different sized trailers is required to anticipate the widely varying uses to which an individual may wish to economically put the trailer. The expense of acquiring and maintaining this large trailer inventory may be quite large as may the required storage space.

Since the greater portion of the expense of trailers lies, not in the body, but in the running gear associated therewith, and since it is the running gear which usually prevents the stacking or otherwise storing of the bodies in a space saving fashion, there is great utility in reduction of the number of expensive and space consuming running gears required to provide a selection of bodies.

It is accordingly a further object of the present invention to provide a novel utility trailer having a single running gear and a plurality of bodies which may be interchangeably mounted thereon.

These and other objects and advantages of the present invention will be readily apparent to one skilled in the art to which the invention pertains from a perusal of the claims and the following detailed description when read in conjunction with the appended drawings.

THE DRAWINGS

FIG. 1 is an exploded pictorial view of the running gear and separable frame of the present invention;

FIGS. 2a—c are diagrammatic illustrations of one method of the present invention for demounting the separable frame with a boat thereon for storage of the boat;

FIG. 3 is an exploded pictorial view of the combination utility and dog trailer of the present invention;

FIG. 4 is an enlarged section taken through line 4-4 of FIG. 3 showing the construction of the panel guides;

FIG. 5 is an enlarged section taken through line 5-5 of FIG. 3 illustrating the engagement of the top of the rear panel;

FIG. 6 is a front view of the rear panel of the utility trailer of FIG. 3 in use as a dog trailer; and FIG. 7 is a diagrammatic illustration of the preferred method of mounting the combination dog and utility body on the running gear.

DETAILED DESCRIPTION

In brief the present invention provides a multipurpose trailer including a single running gear on which one of a plurality of bodies may be detachable secured. The advantages of the invention are particularly great when one of the bodies is a combination utility and dog trailer and another of the bodies is a frame specifically adapted to support a particular body such as a boat when carried by the running gear and when supported by a plurality of legs for storage of the body.

A preferred embodiment of the running gear and the separable frame of the present invention is illustrated in FIG. 1. In this embodiment the separable frame is specifically adapted to support the hull of a boat thereon and, in the interest of clarity, reference will be hereinafter made to the body as a boat.

Referring to FIG. 1, the running gear 10 includes a pair of ground-engaging wheels 12 journaled for rotation on opposite ends of an axle 14 in a conventional manner. A body-supporting frame 16 may be supported on the axle 14 by a pair of conventional leaf springs 18 and 20, each of which may be conventionally secured to the bottom surface of one of a pair of parallel, longitudinally extending side rails 22 and 24 which form the sides of the body-supporting frame 16. The rails 22 and 24 may conveniently be L-shaped in cross section and of the type referred to as "angle iron." The horizontally extending portion of the side rails 22 and 24 may be supported on a plurality of transverse struts 26, 28, 30 and 32, also conveniently of "angle iron," extending therebetween while the other arm of the L-shaped cross section extends vertically upward for a reason hereinafter described.

In addition, the body supporting frame 16 may include four threaded rods 40 welded or otherwise secured to the end transverse struts 26 and 32 to extend transversely outwardly from both sides thereof. A butterfly nut 42 may conveniently be provided for each end of the threaded rods 40.

The running gear 10 may also include a tongue comprising a square tube 34 extending beneath the body supporting frame 16 along the longitudinal axis thereof. The square tube 34 may extend beyond the front end of the body-supporting frame 16 and may be secured thereto in any suitable manner. By way of example, the square tube 34 is illustrated as being suspended from the two end transverse struts 26 and 32 between a pair of L-shaped brackets 36 connected respectively to the downwardly extending arm of the transverse struts 26 and 32 and a pair of plates 38 disposed underneath the square tube 34 and bolted to the brackets 36.

Telescopingly received within the square tube 34 may be an extension 44. The extension 44 may be provided with a plurality of horizontal apertures 46 for receiving a pin 47 inserted through an aligned aperture 48 in the square tube 34. The position of the extension 44 within the square tube 34 may thus be adjusted thereby adjusting the length of the tongue.

The flat baseplate 52 of a conventional winch 50 may be adjustably positioned on the extension 44 by means of a bolt extending from a similar plate 54 disposed beneath the extension. The winch 50 may include a forwardly inclined and upwardly extending support 56 at the upper end of which may be mounted a reel 58 having a manually operated arm and spring biased ratchet gear. A boat support 60 equipped with a suitably configured resilient roller 62 at the free end thereof may be provided.

The running gear 10 also may include a conventional jack 64, conveniently of the scissor type. The jack 64 may be suspended from the square tube 34 of the tongue between the transverse struts 24 and 26 and extends downwardly in its retracted position, a distance less than the distance of the horizontal arm of the struts 22 and 24 to the axle 14 so that the jack 64 will clear any obstacle cleared by the axle 14.

The separable frame 70, illustrated for convenience in FIG. 1 as lifted away from the running gear 10, may include a pair of spaced-parallel and longitudinally extending side rails 72 and 74 of "angle iron" secured respectively at the forward end thereof to a pair of converging rails 76 and 78 of "angle iron." The merging ends of the rails 76 and 78 may terminate immediately adjacent to each other and may be connected by an inverted U-shaped bracket 80 adapted to fit over the tongue extension 44. Apertures may be provided in both downwardly extending arms of the inverted U-shaped bracket 80 so that a pin may be inserted therethrough to fix the front of the separable frame 70 the extension 44. Each of the rails 72, 74, 76 and 78 may conveniently have the horizontally extending arm uppermost with the other arm extending vertically downward from the outer side thereof.

A plurality of transverse struts 82, 84 and 86 may extend between the rails 72 and 74 and may be secured thereto by any suitable means such as by welding. Similarly, a strut 88 extending between the converging rails 76 and 78 may be provided. Each of the struts 82, 84, 86 and 88 may include a boat keel supporting-notched roller 90 rotatably secured to the central portion thereof and extending upwardly, and generally parallel to, the struts 82, 84, 86 and 88.

A pair of short struts 92 may be provided extending transversely inward from the rearward end of the side rails 72 and 74. These struts 92 may be secured at their inner ends to a pair of convergent supports 94 terminating near the center of the transverse strut 82 in proximity to the roller 90.

The separable frame 70 may also include a plurality of pairs of runners 96 and 98 placed as appropriate for the shape of the boat hull to be carried. For example, the pair of runners 96 may extend longitudinally along the separable frame 70 adjacent to the side rails 72 and 74 respectively and may be supported by the struts 92, 82 and 84. The pair of runners 98 likewise may be located adjacent to the converging rails 76 and 78 respectively and may be supported by the struts 86 and 88. These runners may desirably be covered with a nonabrasive material such as carpet or the like so as not to mar the hull of a boat supported thereon.

The separable frame may also include a pair of rear brackets 100 downwardly extending one each from the side rails 72 and 74 adjacent to the transverse strut 82. A similar pair of front brackets 102 may be attached one each to the side rails 72 and 74 by the horizontally extending arm and the vertical arm extending downwardly on the outer edge of the side rails 72 and 74 may be slotted to engage the threaded rod 40. The rear arm 104 of the downwardly extending arms of the rear brackets 100 may extend downwardly beyond the other forward arm 105 thereof to form stops against which the rearmost threaded rods 40 may abut when the separable frame 70 is being mounted on the running gear 10 in a manner hereinafter described.

With continued reference to FIG. 1, a pair of rear legs 106 for supporting the separable frame 70 while storing the boat may be detachably secured to the inside surface of the downwardly extending vertical portion of the side rails 72 and 74 between the struts 92 and 82. These legs 106 may be bolted one each to the rails 72 and 74 or may be hingedly secured thereto as desired. A pair of front legs 108 may similarly be detachably secured to the inside surface of the downwardly extending vertical arms of the converging rails 76 and 78 adjacent to their juncture.

As previously stated, these legs 106 and 108, while illustrated as being detachably connected by pins or bolts, may be pivotally connected to the side rails 72, 74, 76 and 78 and carried permanently by the separable frame 70. In that event the legs 106 and 108 would be pivoted downward and locked into place by any convenient means prior to use.

Each of the legs 106 and 108 is longer in length than the normal height of the running gear rails 22 and 24 above ground as will be explained. For use with a boat-supporting separable frame 70, the front legs 108 may conveniently be slightly longer than the rear legs 106 to allow proper drainage of the boat during storage through the drain usually provided in the transom of boats.

When the separable frame 70 is mounted on the running gear 10, the threaded rods 40 may engage the slots of the bracket 100 and 102, the inverted U-shaped bracket 80 may engage the extension 44, and the side rails 72 and 74 may be cradled inside and against the upright arm of the rails 22 and 24 respectively. The butterfly nuts 36 may then by tightened onto the threaded rods 40 and a pin inserted through the aligned apertures of the U-shaped bracket 80 and the extension 44. The telescoping tongue is of particular advantage where it is desired to use the same frame 70 with boats of different lengths serving as a means for effecting weight distribution.

One method of dismounting the separable frame 70 from the running gear 10 for storing a boat thereon is diagrammatically illustrated in FIGS. 2a, 2b and 2c. Referring to FIG. 2a, the seperable frame 70 is illustrated as supporting a boat 110 on the running gear 10 which has been unhitched from the towing vehicle. In this initial position the extension 44 rests on the ground and the rear end of the trailer is tilted upward. The rear legs 106 may then be lowered, or secured to the side rails 72 and 74.

As illustrated in FIG. 2b, the jack 64 may then be extended to lift the front end of the running gear 10, and hence the separable frame 70 and the boat 110 carried thereby, upwardly so that the trailer is supported in the rear on the rear legs 106 and in the front on the jack 64. One of the front legs 108 may then be lowered, or secured to, one of the converging rails which in this illustration is the rail 78 at the left front of the separable frame 70.

The separable frame may then be detached from the running gear 10 by loosening the butterfly nuts 42 on the threaded rods 90 and removing the pin from the inverted U-shaped bracket 80 and the tongue extension 44. The jack 64 may be used to lower the running gear 10 away from the frame to the ground leaving the separable frame 70 supporting the boat 110 on one of the front legs 108 and the rear legs 106.

Referring to FIGS. 2c, the running gear 10 may be pulled out from under the separable frame 70 once it has been lowered completely to the ground and the second one of the front legs 108 may then be secured to the other converging rail 76 as shown in dotted lines. The boat may then be stored on the frame above ground with the hull fully supported. Minor repairs may be made to the hull, and contact with the ground is avoided. Since the front legs 108 are longer than the rear legs 106, the boat will be tilted upward in the front for proper drainage. Damage moreover due to rocking of the boat hull on the ground by children at play may also be avoided.

To mount the separable frame 70 with the boat 110 thereon to the running gear 10 the process described above may simply be reversed. With one of the forward legs 108 removed the running gear 10 may be correctly positioned underneath the separable frame 70 by backing the running gear 10 thereunder until the rearmost threaded nuts 40 abut the longer arms 104 of the rear brackets 100. The jack 64 may then be used to raise the front end of the running gear 10 to the height of the separable frame 70 so that the frame may be secured thereto by the butterfly nuts 42 and bolts 40 and by the pin extending through the bracket 80 and the tongue extension 44.

Raising the separable frame 70 slightly by means of the jack 64 will free the lower end of the one of the forward legs 108 which then may be removed. By retracting the jack 64 the front end of the trailer may be lower to free the lower ends of the rear legs 106 which then may be easily removed.

The running gear 10 when separated from the separable boat supporting frame 70 may then be utilized to support other trailer bodies. For example, the running gear 10 may be utilized to transport a novel combination utility and dog trailer of the type shown in FIG. 3. Referring to FIG. 3, the combination utility and dog trailer body 112 may include a substantially planar bottom member 114 and a pair of permanent side members 116 extending vertically upward therefrom.

Carried at both ends of the side members 116 may be transverse panel-receiving guides 118. As shown in greater detail in FIG. 4, the panel-receiving guide 118 may be formed by a pair of upright L-shaped members 120 and 122 having arms connected to the inner and outer surfaces respectively of the side members 116 and the perpendicular arms thereof extending inwardly normal to the side members 116 to form a channel for receiving a panel. Two of a plurality of removable panels 124, 126 and 128 may then be inserted between the two inwardly extending arms of the members 120 and 122 to form front and back panels of the combination utility and dog trailer 112. The side members 116 may also include a pair of vertical panel guides 129 positioned on their interior surfaces of the side members 116 laterally across from each other for receiving one of the removable panels 124, 126 and 128, thereby forming two separate compartments in the combination trailer body 112.

Each of the removable panels 124, 126 and 128 may be formed from a planar rectangular sheet 142 having a top flange 140. As shown more clearly in FIG. 6, the panel 124 may further include a door 144 and openings 126 for ventilation of the rearmost compartment. This panel 124, of course, may be used to adapt the trailer body 112 for use as a dog trailer with separate compartments for the dogs and for hunting gear, game, or the like.

A top 130 for enclosing the trailer 112 may include a flat horizontal sheet 132 with downwardly extending flanges 134 around the perimeter thereof. On one end of the flange 134 a handle 136 may be provided to facilitate the lifting of the top 130. The other end flange, as shown in more detail in FIG. 5, may include a horizonally extending lip 138 for engagement with the top flange 140 provided along the top of the removable panel inserted in the rear panel guides 118.

With the two regular panel members 126 and 128 inserted at the front and rear panel guides 118 a utility trailer body is formed. If it is desired to convert the trailer body 112 into a dog trailer having a compartment for dogs and a compartment for camping and hunting gear, game, or the like, the dog panel member 124 may be inserted in the rear panel guides 118 and the remaining panels 126 and 128 may be inserted in the other panel guides 118 and 129 thus forming the two separate compartments. The top 130 may then be lifted at the forward end thereof by the handle and slide backwardly to expose the camping gear compartment of the trailer body while keeping the dog compartment covered. Alternatively, as shown in dotted lines, a sealed hinge 148 may be provided in the top 130 above the panel inserted in the panel guides 129 so that the front portion of the cover may be pivoted upwardly to expose the front compartment independently of the exposure of the dog compartment.

A plurality of apertures 150 may be provided in the side members 116 for receiving pins inserted through apertures 151 in the body supporting frame 16 illustrated in FIG. 1 to secure the trailer body 112 to the running gear 10. The aperture 151 may also be utilized to secure the frame 70 of FIG. 1 to the running gear 10 if so desired.

The novel combination utility and dog trailer 112 of the present invention may be mounted on the running gear 10 in the manner illustrated in FIG. 7. With reference to FiG. 7, the jack 64 may be extended to tilt the running gear 10 upward in the front and downward in the rear about the axle so that the rear portion of the body-supporting frame 16 rests on the ground. The rope from the winch 58 may then be connected to the top handle 136 or other suitable means provided at the front of the trailer body 112 and the winch utilized to pull the trailer body 112 onto the running gear 10.

While the present invention has been illustrated and described in connection with a combination boat and dog utility trailer, other embodiments within the spirit of the invention will be readily apparent to one skilled in the art to which the invention pertains from a reading of the foregoing. It is accordingly to be understood that the scope of the invention is to be limited solely by the language of the appended claims when accorded a full range of equivalents.

We claim:

1. A multipurpose trailer adapted to alternatively transport a boat-supporting means or a utility body comprising:

a running gear including: a frame, a plurality of ground-engaging wheels journaled on an axle carried by said frame, and means for detachably securing said running gear to a vehicle;

boat-supporting means adapted to be carried by said frame for supporting a boat thereon, comprising a plurality of longitudinally spaced boat keel engaging rollers and a pair of longitudinally extending boat-engaging runners;

means for a utility body; alternatively detachably securing either said boat-supporting means or said utility body to said frame; and, support means for supporting said boat-supporting means above ground independently of said running gear.

2. A trailer as set forth in claim 1 wherein said support means comprises a plurality of legs, means for detachably securing each of said legs to an end of said boat-supporting means, said legs being of unequal length whereby one end of said boat-supporting means is supported higher above ground than the other end thereof.

3. A trailer as set forth in claim 1 wherein said utility body is a combination utility/dog trailer body.

4. A trailer as set forth in claim 1 wherein said boat supporting means may be removed from said frame while a boat is supported thereon.

5. A trailer as set forth in claim 1 wherein said running gear includes jack means for raising and lowering one end of said frame to facilitate the mounting and dismounting thereon either said boat-supporting means or said utility body.

6. A trailer as set forth in claim 1 wherein said means for detachably securing said running gear to a vehicle includes a variable length tongue comprising first and second telescoping members and means for mutually securing said members whereby the weight carried by the trailer may be distributed and various lengths accommodated.

7. A trailer as set forth in claim 1 wherein said means for detachably securing said running gear to a vehicle includes a tongue and wherein said running gear further includes a winch carried by said tongue for pulling either said boat-supporting means or said utility body onto said frame.

8. A trailer as set forth in claim 1 wherein said support means supports said boat-supporting means at a height greater than the height above ground thereof when carried by said running gear.

9. A trailer as set forth in claim 8 wherein said support means includes a plurality of legs and means for detachably securing each of said legs to an end of said boat-supporting means.

10. A trailer as set forth in claim 1 wherein said utility body is a combination utility and dog trailer comprising:

substantially planar top and bottom members, said members being vertically spaced and substantially coextensive;

a pair of upright side members extending upwardly from said bottom member along the sides thereof;

cooperating guide means carried by said side members at one end thereof and at a point intermediate the length thereof; and a pair of panels each adapted to be interchangeably inserted in said cooperating guide means to thereby form a partition between said upright members and said to and bottom members, one of said panels having ventilation means and a door.

11. A trailer as set forth in claim 10 wherein said top member is slidably secured to said side members for longitudinal movement along at least a portion of the length thereof.

12. A trailer as set forth in claim 10 wherein a portion of said top member forward of said intermediate guide means may be pivoted upwardly to permit access to the portion of said utility body forward of said second guide means without the removal of said top member.

13 A trailer as set forth in claim 1 wherein said means for detachably securing said running gear to a vehicle includes a variable length tongue comprising first and second telescoping members and means for mutually securing said members whereby the weight carried by the trailer may be distributed and various lengths accommodated, wherein said running gear includes jack means for raising and lowering one end of said frame to facilitate the mounting and dismounting thereon of one of said boat-supporting means and said utility body and a winch carried by said tongue for pulling said either said boat-supporting means or said utility body onto said frame, and wherein said boat-supporting means include a plurality of legs each detachably secured to an end thereof for supporting said boat-supporting means at a height greater than the height above ground thereof when carried by said running gear.

UNITED STATES PATENT OFFICE
CERTIFICATE OF CORRECTION

Patent No. 3,578,190    Dated May 11, 1971

Inventor(s) Joe C. May et al.

It is certified that error appears in the above-identified patent and that said Letters Patent are hereby corrected as shown below:

Column 2, line 23, "detachable" should read -- detachably --. Column 3, line 59, after "74" insert -- between the transverse struts 84 and 86. Each of the brackets 100 and 102 may be secured to the top surface of the side rails 72 and 74 --. Column 4, line 18, "bracket", first occurrence, should read -- brackets --; line 22, "by" should read -- be --. Column 5, line 57, after "handle" insert -- 136 --. Column 6, between lines 25 and 26, insert -- a utility body; --; line 26, cancel "a utility body;"; line 45, after "thereon" insert -- of --. Column 7, line 3, "to" should read -- top --.

Signed and sealed this 2nd day of November 1971.

(SEAL)
Attest:

EDWARD M. FLETCHER, JR.
Attesting Officer

ROBERT GOTTSCHALK
Acting Commissioner of Patents